(12) United States Patent
Ozer et al.

(10) Patent No.: US 9,073,520 B2
(45) Date of Patent: Jul. 7, 2015

(54) CONNECTING DEVICE FOR WINDSCREEN WIPERS

(75) Inventors: Ahmet Ozer, Kocaeli (TR); Salih Bekir Sonmez, Kocaeli (TR)

(73) Assignee: TEKLAS KAUCUK SANAYI VE TICARET A.S., Kocaeli (TR)

( * ) Notice: Subject to any disclaimer, the term of this patent is extended or adjusted under 35 U.S.C. 154(b) by 171 days.

(21) Appl. No.: 13/812,224

(22) PCT Filed: Jul. 28, 2011

(86) PCT No.: PCT/IB2011/001750
§ 371 (c)(1),
(2), (4) Date: Jan. 29, 2013

(87) PCT Pub. No.: WO2012/014054
PCT Pub. Date: Feb. 2, 2012

(65) Prior Publication Data
US 2013/0111691 A1    May 9, 2013

(30) Foreign Application Priority Data

Jul. 28, 2010   (TR) .............................. a 2010 06252

(51) Int. Cl.
*B60S 1/38*   (2006.01)
*B60S 1/40*   (2006.01)

(52) U.S. Cl.
CPC *B60S 1/40* (2013.01); *B60S 1/3879* (2013.01); *B60S 1/3808* (2013.01); *B60S 1/3868* (2013.01); *B60S 1/4048* (2013.01); *B60S 2001/4051* (2013.01)

(58) Field of Classification Search
CPC .............. B60S 1/4038–1/4048; B60S 1/4064; B60S 2001/4051–2001/4061; B60S 1/3865–1/3868
USPC ....................... 15/250.32, 250.201, 250.361, 15/250.43–250.48
See application file for complete search history.

(56) References Cited

U.S. PATENT DOCUMENTS

| | | | |
|---|---|---|---|
| 2004/0211021 A1 | 10/2004 | Weber et al. | |
| 2006/0059647 A1* | 3/2006 | Ostrowski | 15/250.32 |
| 2006/0064842 A1* | 3/2006 | Verelst et al. | 15/256.5 |
| 2006/0272119 A1* | 12/2006 | Genet | 15/250.32 |
| 2008/0134455 A1* | 6/2008 | Kinnaert et al. | 15/250.32 |
| 2010/0107354 A1* | 5/2010 | Verelst et al. | 15/256.5 |

FOREIGN PATENT DOCUMENTS

| | | |
|---|---|---|
| DE | 19757872 | 7/1999 |
| DE | 10130903 | 5/2002 |
| EP | 2143603 | 1/2010 |
| EP | 2360070 | 8/2011 |

* cited by examiner

*Primary Examiner* — Mark Spisich
*Assistant Examiner* — Andrew A Horton
(74) *Attorney, Agent, or Firm* — Notaro, Michalos & Zaccaria P.C.

(57) ABSTRACT

The present invention relates to a connection device that is used for connecting a wiper blade (800) comprising an elastic wiper profile (6), an arc-shaped elastic metal vertebra (5) and a bracket (3) preferably directly fixed to the vertebra (5) at the longitudinal middle region, to a wiper arm (900) of which one end is connected to a motor in the vehicle, that comprises the bracket (3), an adapter (1) connected onto the said bracket (3) so as to rotate around the said rotational axis (901) and the free end (9) of the said wiper arm (900) that can be inserted and locked over the said adapter (1).

14 Claims, 6 Drawing Sheets

CONNECTING DEVICE FOR WINDSCREEN WIPERS

REFERENCE TO RELATED APPLICATIONS

Figure 1:
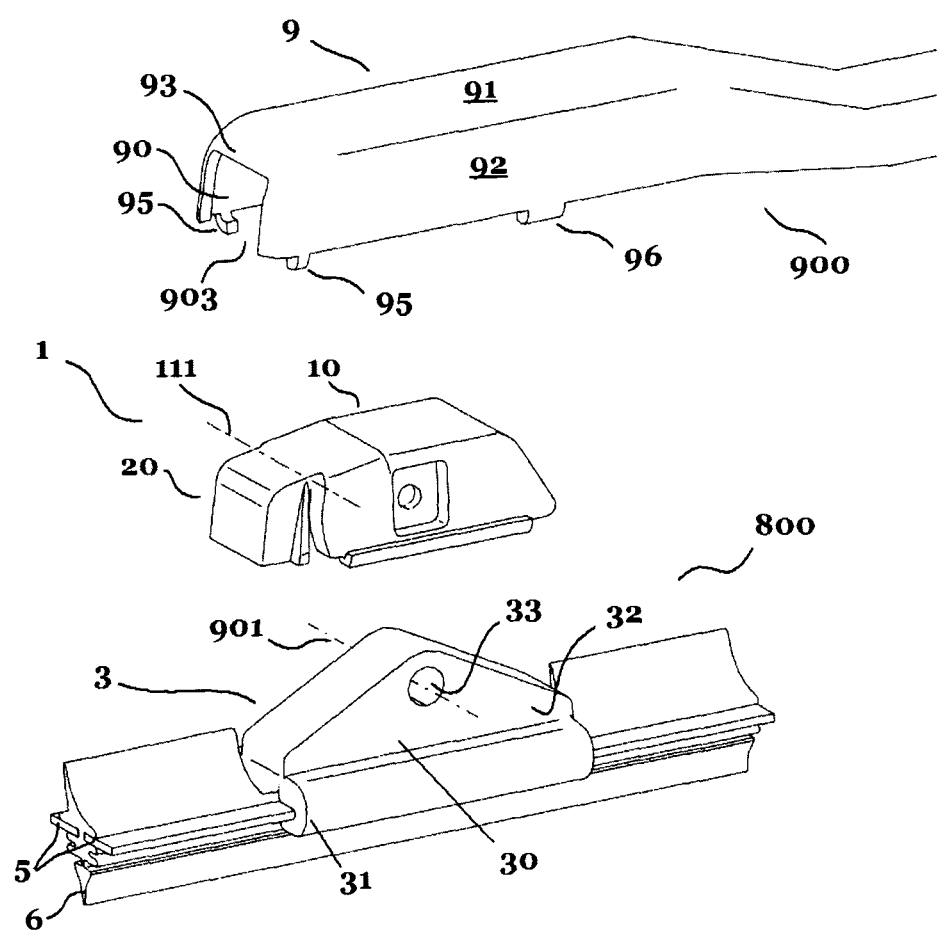

This application is a 371 of PCT/IB11/01750, filed on Jul. 28, 2011, and claims the benefit of Turkish Patent Application No. 2010/06252, filed on Jul. 28, 2010.

RELATED TECHNICAL FIELD

The present invention relates to the connection of a wiper blade used in vehicles, having a longitudinal, flat resilient metal carrier vertebra, an elastic wiper profile having an end portion for wiping the glass surface and mounted on the vertebra and an integrated connection element used for the connection of the wiper arm, and a wiper arm the other end of which is connected to the vehicle.

PRIOR ART

The wiper systems wherein a preferably rubber wiper profile which wipes the surface of the windscreen is supported by a flat, long, resilient metal carrier frame, also known as vertebra, bent like a bow and wherein the system is connected to the wiper arm from a point preferably at the longitudinal middle region have been known for a long time. In the said wiper systems, end caps providing the unity of the system by being mounted generally on the free longitudinal ends of the wiper blade and a spoiler provided on the upper portion of the vertebra with respect to the windscreen are provided.

In order that a wiper blade of this type contact the windscreen surface at every point in a convenient manner, the wiper blade is required to be pivotally connected to the free end of the wiper arm so as to rotate around an axis. This connection should be very strong so that the said connection does not unlock or loosen in the working conditions of the wiper. On the other hand, when the end user wants to change the wiper blade, he/she should easily detach the blade from the wiper arm and also easily attach the new blade to the arm. These requirements are substantially solved by means of the arm-blade connection, also called bayonet design.

In the Patent No. EP 1403156 B1 a wiper is described, that is mounted onto a bracket fixed to the vertebra and whereto a U-shaped adapter pivotally connected to the bracket is mounted. The circular protuberances serving as pins at both sides of the bracket are seated into the holes on both flanks of the adapter and thus, the adapter is pivotally connected to the bracket. A U-shaped wiper arm, the end of which is composed of a top and two side walls, is mounted onto this adapter by being longitudinally slid. A flexible tenon disposed as connected to the adapter is used in order to detachably lock the arm on the adapter. A protuberance at the end of the tenon is seated into a hole formed on the wiper arm by means of the elastic deformation of the tenon. The said tenon and the corresponding hole can be on the upper surfaces of the adapter and the arm respectively, or on the two side surfaces thereof. In patents and patent applications such as EP1937524, EP1565359, similarly connections are described, wherein a protuberance at the end of a flexible tenon connected to the adapter from two sides or from top is inserted to a shoulder on the wiper arm.

These connections are practical and safe. However, the common features thereof are that the adapter and/or the bracket are visible from under or around the arm at the visible top and side portions of the connection and that the connection of the arm and the adapter and/or the bracket at these regions are exposed to external factors such as snow, rain, dust, mud. This is a necessity required by the connection system between the adapter and the arm. For example, in EP1937524 and EP1565359, the front portion of the adapter covers the front portion of the arm, and the tenon used for releasing the locking mechanism is engaged with the shoulders on the top surface of the arm in one of the documents and with the shoulders on the lateral surfaces in the other document. In EP1403156, the end of the arm is seated into the bracket and the adapter, and in the assembled state, the adapter, the bracket and the whole arm can be seen at the same time and the movable regions of the connection are exposed to all kinds of external factors.

While the arm is generally produced from metal, the adapter, that is produced from plastic as a requirement for elasticity, is of different color and luminosity. Therefore, a portion of the adapter being visible on the top and lateral surfaces of the arm that is visible to the end user causes an unaesthetic appearance.

In addition to this, the region where the arm and the adapter joins being open like this is exposed to the risk of mud, dust, snow accumulating at the connection region, thus to the risk of the connection that should be movable becoming dysfunctional.

In order to eliminate these disadvantages, a connection mechanism is described by means of the present invention, wherein the connection elements on the blade are almost completely covered by the arm so as to, on one hand, provide an aesthetic appearance and on the other hand to protect the connection region from external factors, and which, however, enables the blade to be easily connected to the arm and to be easily detached when desired.

DEFINITION OF THE FIGURES

The present invention is described in detail by referring to the attached figures. In the figures:

FIG. 1 is an exploded isometric view of the connection device.

Figure 2:
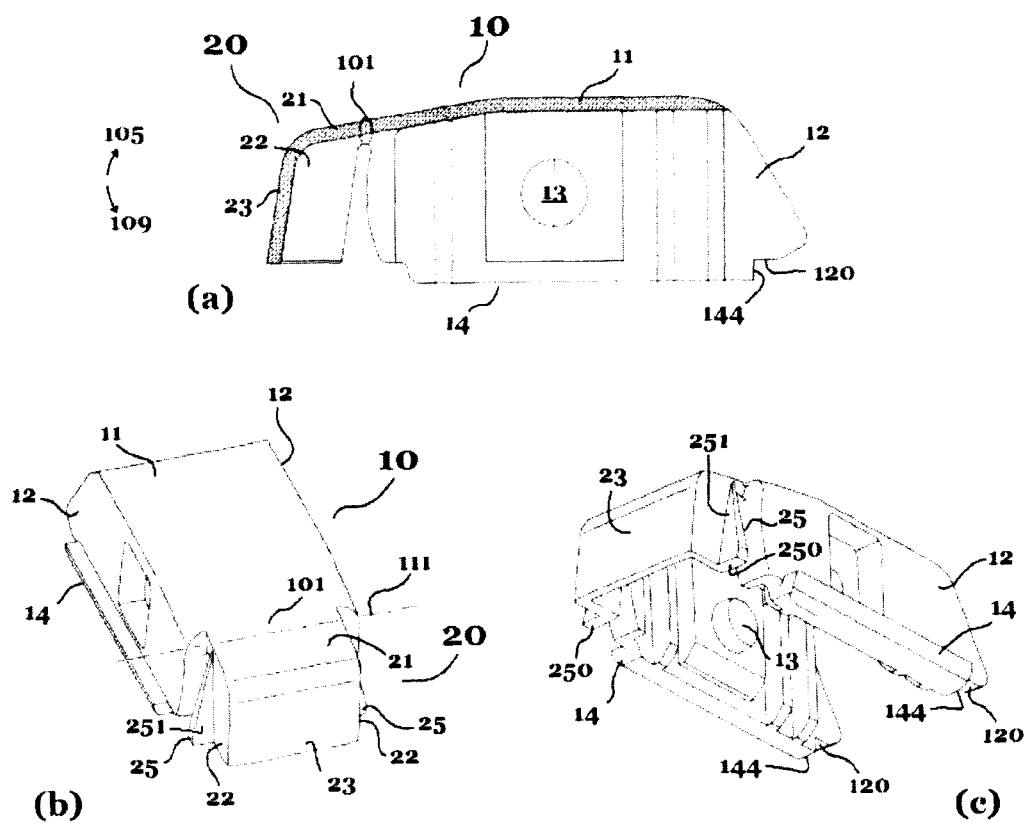

FIG. 2 comprises the cross-sectional (2-*a*) and the isometric (2-*b, c*) views of the adapter used in the said connection device.

Figure 3:
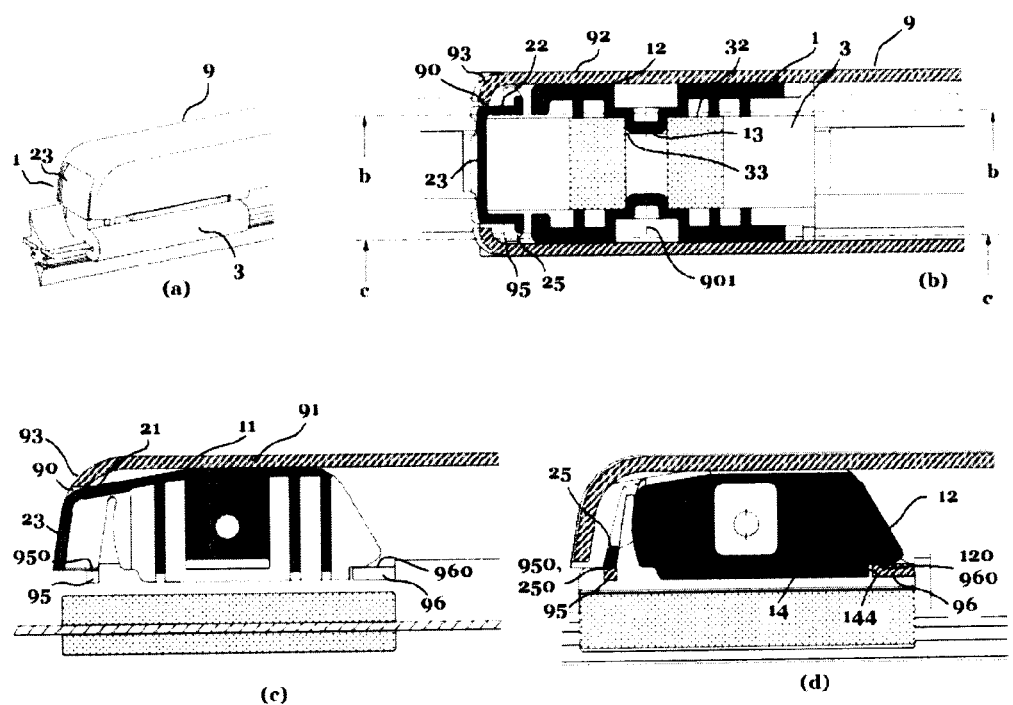

FIG. 3 comprises the isometric (3-*a*) and the cross-sectional (3-*b, c, d*) views of the connection of the present invention in the assembled state.

Figure 4:
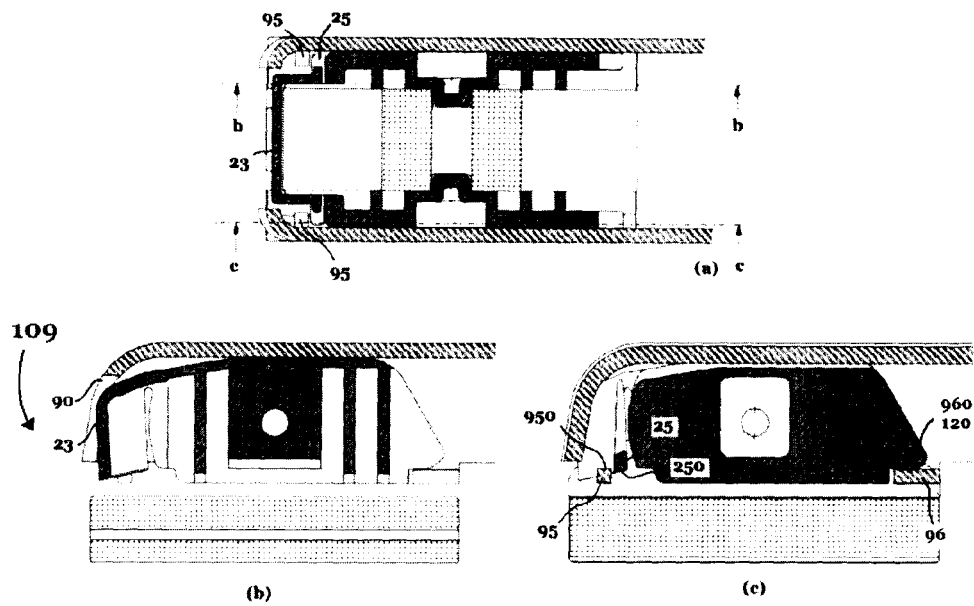

FIG. 4 comprises the top (4-*a*) and sideways (4-*b, c*) cross-sectional views of the connection of the present invention when the first locking is deactivated.

Figure 5:
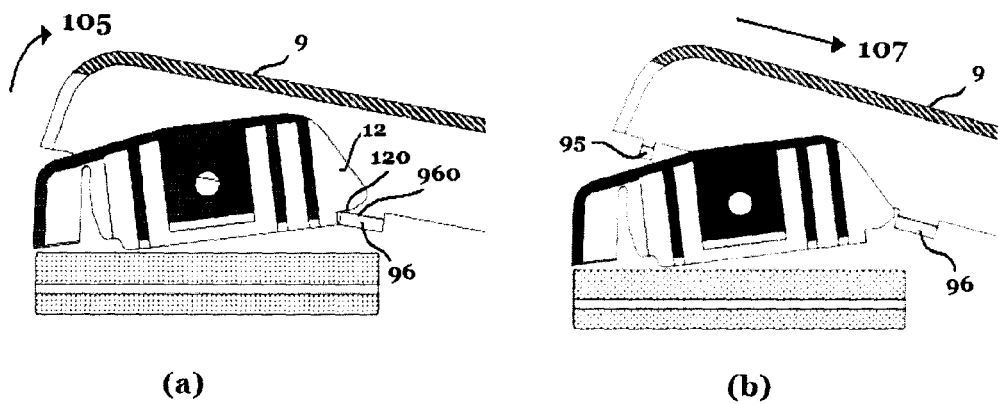

FIG. 5 comprises two cross-sectional views of the steps of detaching the arm and the adapter from each other.

Figure 6:
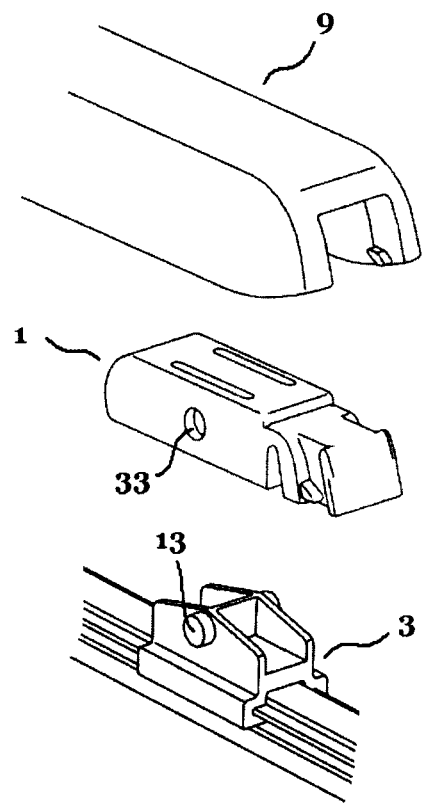

FIG. 6 is the exploded isometric view of an alternative embodiment of the connection of the present invention.

Figure 7:
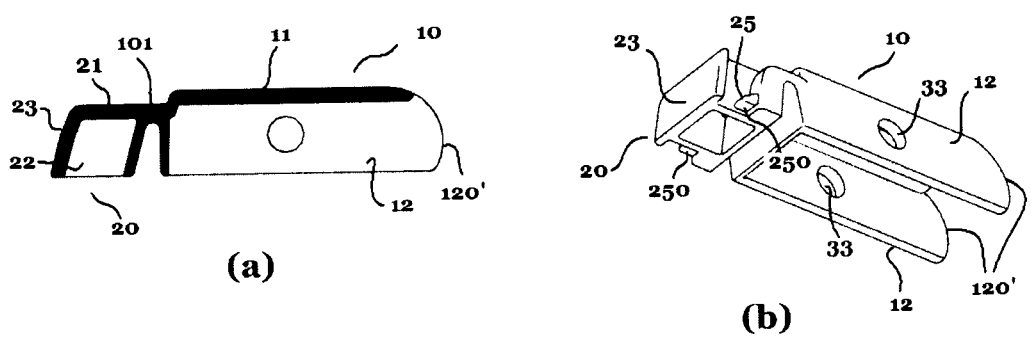

FIG. 7 comprises the cross-sectional (7-*a*) and the isometric (7-*b*) views of the adapter in the alternative embodiment of the connection of the present invention.

Figure 8:
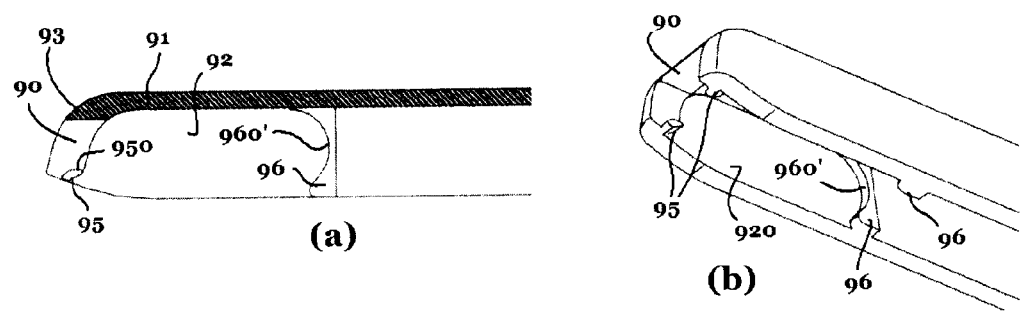

FIG. 8 comprises the cross-sectional (8-*a*) and the isometric (8-*b*) views of the arm in the alternative embodiment of the connection of the present invention.

The elements illustrated in the figures are numbered as follows:
1 Adapter
10 Body
11 Top wall
12 Side wall
120 Bottom surface
120' Rear surface
13 Pin protuberance 14 Flange
20 Locking portion
21 Top wall
22 Side wall
23 Front wall
25 Lug
250 Lug bottom surface
101 Flexing zone
111 Movement axis
3 Bracket
31 Leg
32 Lateral surface
33 Pin housing
5 Vertebra
6 Wiper profile
800 Wiper blade
900 Wiper arm
9 Free end of wiper arm
91 Top wall
92 Side wall
93 Front wall
90 Window
95 Front locking legs
950 Top surface of locking legs
96 Rear locking legs
960 Top surface of rear locking legs
960' Interior surface of rear locking legs
901 Rotational axis
105 Upward
107 Backward
109 Downward

DETAILED DESCRIPTION OF THE INVENTION

The connection mechanism of the present invention is used for connecting a wiper blade (800) having an elastic wiper profile (6) having an end portion for wiping the glass surface, an arc-shaped resilient vertebra (5) and a bracket (3) fixed to the vertebra (5) at the longitudinal middle region to a wiper arm (900), one end of which is connected to a motor in the vehicle so as to rotate around a rotational axis (901). The mechanism consists of the said bracket (3), an adapter (1) connected onto the bracket (3) so as to rotate around the said rotational axis (901) and the free end (9) of the wiper arm (900) that is specially formed so as to be inserted over the said adapter (1) and locked.

The vertebra (5) used in the figures and the description is composed of two pieces, each piece seated into the channels disposed at both sides of the wiper profile (6), provided that the embodiment of the present invention is not limited to this configuration.

The said bracket (3) is fixed to the blade (800), preferably directly to the vertebra (5) by means of its hook-shaped legs (31), as seen in the exploded isometric drawing in FIG. 1. The body (30) on these legs (31) has preferably two parallel lateral surfaces (32). A hole- or recess-shaped pin housing (33) with a circular cross-section is disposed on each of these two lateral surfaces (32). These pin housings (33) are concentric and the central axes thereof form the said rotational axis (901).

The said free end (9) of the wiper arm (900) is composed of two parallel side walls (92) and a top wall (91) and a front wall (93) joining the former two. The front wall (93) is partially empty by means of a window (90) with its lower portion (903) open.

Locking legs (95, 96) in protuberance or extension form are disposed on the side walls (92) of the wiper arm (900). The front locking legs (95) are disposed near the front wall (93), preferably just behind the wall (93) and can be of different cross-section and configuration from the rear locking legs (96) longitudinally disposed in a position away from the front wall (93). Preferably, both locking legs (95, 96) are oppositely disposed in pair, one on each of the two side walls (92).

In the preferred arrangement of the present invention, both the front locking legs (95) and the rear locking legs (96) are disposed as inwardly bent extensions facing each other, extending along the lower edge of the said side walls (92).

The end (9) of the wiper arm (900) is connected onto the bracket (3) by means of an adapter (1).

The adapter (1), that can be seen in FIG. 2 in detail, is produced from a flexible material, preferably plastic. The adapter (1) is composed of a U-shaped body (10) having side walls (12) and a top wall (11), that can be pivotally mounted onto the bracket (3), and a locking portion (20) that is connected to the body (10) so as to move in downward (109) and upward (105) directions.

The said locking portion (20) is composed of two side walls (22) and a top wall (21) and a front wall (23) joining the former two and is connected to the body (10) so as to move around a movement axis (111) parallel to the said rotational axis (901) in downward (109) and upward (105) directions with respect to the body (10). In the preferred arrangement, the adapter (1) is produced from a flexible plastic as a single-piece and the said movement axis (111) passes through a flexing zone (101) joining the top walls (11, 21) of the body and the locking portion (10, 20). However, in the alternative embodiments of the present invention, the locking portion (20) is produced as a separate piece and can be pivotally connected, afterwards, to the body (10) so as to make the said movement (105-109).

As shown in FIG. 2-c, at least one pin protuberance (13) with circular cross-section extending so as to form a protuberance inwards is disposed on both side walls (12) of the body (10). These protuberances (13) are oppositely and concentrically disposed, each on one of the two surfaces and are dimensioned so as to be seated into the said pin housings (33) on the bracket (3). Flanges (14) are disposed on the side walls (12) of the body (10) so as to protrude outwards.

FIG. 3-a shows the assembled state of the connection mechanism of the present invention. As can be seen better in the top cross-sectional view in FIG. 3-b, the adapter (1) is inserted over the bracket (3) from above such that the said side walls (12) of the body (10) surround the lateral surfaces (32) of the bracket (3) and that the pin protuberances (13) on the adapter (1) are seated into the pin housings (33) on the bracket (3). Thus, the adapter (1) is pivotally connected onto the bracket (3) so as to rotate around the said rotational axis (901). The described assembly of the adapter (1) onto the bracket (3) is realized thanks to the flexible configuration of the adapter (1).

The wiper arm (900) is mounted onto the adapter (1) such that the end (9) thereof covers the adapter (1) from above, sides and front and surrounds it. As shown in the cross-sectional views in FIGS. 3-b and c, in this position the side walls (12, 22) of the adapter (1) are covered by the side walls (92) of the arm (9) and the top walls (11, 21) thereof by the top wall (91) of the arm (9). The front wall (23) of the locking portion (20) enters into the window (90) on the front wall (93) of the arm (900). Thus, as shown in the isometric view in FIG. 3-a, when the assembly is completed, the free end (9) of the arm (900) completely surrounds the adapter (1) from above and sides and provides a visual unity. The front wall (23) of the adapter (1) that can be seen through the window (90) cannot be seen by the end user in the normal working conditions.

Various locking means are present, providing the end (9) of the arm (900) to be detachably locked on the adapter (1).

At least one lug (25) preferably in protuberance form is provided on the locking portion (20) of the adapter (1). These lugs (25) work together with the front locking legs (95) disposed on the arm (900) and form the first locking means providing the end (9) of the arm (900) to be locked on the adapter (1). As shown in FIGS. 2-b and c, these lugs (25) are provided on at least one, preferably both side walls (22) of the locking portion (20) so as to form protuberances. As shown in the cross-sectional views in FIGS. 3-c and 3-d, in the working position, the bottom surfaces (250) of the lugs (25) are seated onto the top surface (950) of the locking legs (95).

The side walls (12) of the body (10) of the adapter (1) and the rear locking legs (96) of the arm (900) engaged with the said walls (12) form the second locking means. In the preferred arrangement, the top surface (960) of the rear locking legs (96) in form of inwardly bent extensions facing each other is engaged with the bottom surface (120) of the side wall (12) of the adapter (1) as shown in FIGS. 3-c and d.

When the connection of the wiper blade (800) and the arm (900) is desired to be dismantled, the front wall (23) of the locking portion (20) of the adapter (1) is pressed downward (109) as shown in FIG. 4-b. By means of the flexible feature of the adapter (1) described above, the locking portion (20) gets close to the body (10) as a result of the elastic deformation of the flexing zone (101). This movement provides the lugs (25) on the locking portion (20) to be released from the front locking legs (95) on the arm (900) (FIGS. 4-a and c). Thus, the first locking means is deactivated. Then, the end (9) of the arm (900) is rotated around the rear locking legs (96) engaged with the bottom surface (120) of the side wall (12) of the adapter (1) such that the front wall (93) thereof moves upwards (105), as shown in FIG. 5-a. By this movement, the front wall (93) of the arm (900) is released from the front wall (23) of the adapter (1). Afterwards, as the arm (900) is pulled backward (107) as shown in FIG. 5-b, the rear locking legs (96) are provided to be released from the side walls (12) of the adapter (1), and the blade (800) and the arm (900) are completely detached.

The third locking means consists of the front wall (93) of the arm (900) and the lug (25) that the front wall (93) is engaged with, and provides an additional security preventing the blade (800) and the arm (900) from detaching from each other, thus preventing the loss of the blade (800), in case the first and the second locking means (25, 95; 12, 96) described above are disabled. When the first and the second locking means (25, 95; 12, 96) are disabled, the arm (900) may slide a little backwards over the adapter (1); however, the arm (900) is stopped at the point where the said closed front wall (93) bears against the front surface (251) of the said lugs (25) and the blade (800) is prevented from being completely detached from the arm (900).

As in an alternative embodiment of the present invention shown in FIG. 6, the pin protuberances (13) providing the pivotal connection of the adapter (1) and the bracket (3) can be disposed on the lateral surfaces (32) of the bracket (3) and the housings (33) on the side walls (12) of the adapter (1).

As in the alternative arrangement shown in FIGS. 7 and 8, the locking legs (95, 96) on the free end (9) of the arm (900) can be disposed on the inner surface (920) of the side walls (92) of the arm (900) in form of protuberance. In this arrangement, the front locking legs (95) have a surface (950) whereon the bottom surface (250) of the lugs (25) disposed on the locking portion (20) of the adapter (1) is seated.

The rear locking legs (96) are provided in form of protuberance on the same inner surface (920), and this time may have an interior surface (960') that engages with the rear surface (120') of the side wall (12) of the adapter (1).

The invention claimed is:

1. A connection device that is used for connecting a wiper blade (800) comprising an elastic wiper profile (6), an arc-shaped elastic metal vertebra (5) and a bracket (3) preferably directly fixed to the vertebra (5) at the longitudinal middle region, to a wiper arm (900) by means of an adapter (1), so as to rotate around a rotational axis (901), where one end of said arm is connected to a motor in the vehicle, said device comprising said bracket (3), said adapter (1) connected to said bracket (3) so as to rotate around said rotational axis (901) and a free end (9) of said wiper arm (900) that can be inserted and locked over said adapter (1), wherein
said free end (9) of the arm (900) is composed of a top wall (91), two side walls (92) and a front wall (93) where a window (90) is provided so as to form an opening thereon, so as to cover the adapter (1) from above, sides and front and
said adapter (1) is composed of a body portion (10) that can be pivotally mounted onto the bracket (3) and a locking portion (20) that is pivotally connected to said body (10) so as to move downward (109) relative to the body (10) and that has a front wall (23) seated into said window (90),
wherein said connection device has locking means composed of lugs (25) provided on both side walls (22) of the locking portion (20) so as to protrude outwardly in opposite directions and front locking legs (95) engaged with said lugs (25), provided on the end (9) of the arm (900).

2. A connection device as in claim 1, wherein said lugs (25) have a bottom surface (250) that is seated, in the locked position, onto a top surface (950) of said front locking legs (95).

3. A connection device as in claim 2, wherein said locking means (25, 95) are brought to unlocked state by said bottom surface (250) being detached from said top surface (950) as the front wall (23) of the locking portion (20) is pressed downward (109).

4. A connection device as in claim 1, wherein said locking legs (95) are disposed on at least one, preferably both of the side walls (92) of the arm (900) at a position near the front wall (93), in form of protuberance or extension.

5. A connection device as in claim 1, further comprising additional locking means composed of a side wall (12) of said body (10) and a rear locking leg (96) engaged with said wall (12), provided on the end (9) of the arm (900).

6. A connection device as in claim 5, wherein said rear locking leg (96) is disposed on at least one, preferably both of the side walls (92) at a position away from the front wall (93), in form of protuberance or extension.

7. A connection device as in claim 6, wherein said rear locking leg (96) is provided as an extension at the lower edge of the arm side walls (92) and has a top surface (960) engaging with a bottom surface (120) of the side wall (12) of the adapter (1).

8. A connection device as in claim 6, wherein said rear locking leg (96) is provided as a protuberance at an inner surface (920) of the arm side walls (92) and has an interior surface (960') engaging with a rear surface (120') of the side walls (12) of the adapter (1).

9. A connection device as in claim 1, further comprising a third locking means that prevents the blade (800) and the arm (900) from completely detaching from each other in case said locking means (25, 95; 12, 96) are disabled, and that is composed of said lugs (25) and the front wall (93) of the arm (900) engaging with a front surface (251) of the lugs (25).

10. A connection device as in claim 1, wherein said body (10) has a U-shaped cross-section composed of a top wall (11) and two side walls (12).

11. A connection device as in claim 10, wherein said locking portion (20) has a U-shaped cross-section composed of a top wall (21) and two side walls (22), one end of which is closed by the front wall (23).

12. A connection device as in claim 11, wherein said locking portion (20) is connected to the body (10) so as to move around a movement axis (111) parallel to said rotational axis (901).

13. A connection device as in claim 12, wherein the body and the locking portion (10, 20) of said adapter (1) are two separate pieces that can be pivotally joined afterwards.

14. A connection device as in claim 12, wherein said adapter (1) is in the form of a single-piece made of elastic plastic, and the body and locking portion (10, 20) are connected to each other by means of a flexing zone (101) joining the top walls (11, 21) thereof.

\* \* \* \* \*